United States Patent [19]

Stanley

[11] Patent Number: 4,844,571
[45] Date of Patent: Jul. 4, 1989

[54] HOMODYNE INTERCONNECTIONS OF INTEGRATED CIRCUITS

[76] Inventor: Ian W. Stanley, 295, Henley Road, Suffolk, England, 1P1 6TB

[21] Appl. No.: 50,572

[22] Filed: May 18, 1987

[30] Foreign Application Priority Data

May 19, 1986 [GB] United Kingdom ............... 8612072

[51] Int. Cl.⁴ ........................... G02B 6/10; G02B 6/12
[52] U.S. Cl. .............. 350/96.11; 350/96.13; 350/96.14
[58] Field of Search ............ 350/96.11, 96.12, 96.13, 350/96.14; 455/617

[56] References Cited

FOREIGN PATENT DOCUMENTS 0016608 10/1980 European Pat. Off. .
0150929 8/1985 European Pat. Off. .
0168192 1/1986 European Pat. Off. .

OTHER PUBLICATIONS

Electronic Design, vol. 30, No. 11, 5/1982, pp. 44–55, M. Grossman "Optical Devices in Wells Join Electronic Circuitry on Ship".
Patent Abstracts of Japan, vol. 7, No. 84, (E-169) [1229], Apr. 8, 1983; & JP-A-58 12 451 (Nippon Denshin Denwa Kosha) 24-01-1983).
Goodman et al, "Optical Interconnection for VLSI Systems", IEEE, vol. 72, No. 7, Jul., 1984.
M. Kimura et al, Jap., Jl. Appl. Phys., Vol. 19, No. 7, Jul. 1980, pp. L372–L374.

Primary Examiner—William L. Sikes
Assistant Examiner—Akm E. Ullah

[57] ABSTRACT

An optical interconnection system for integrated circuits has an optical source that is split into at least two parts. One part is modulated and the other part is transmitted to a detector and input on the local oscillator signal in homodyne detection. A single source may be split many ways to provide a plurality of beams for modulating and a plurality of local oscillator inputs to separate detectors. Both inter and intra wafer connections are described.

18 Claims, 1 Drawing Sheet

HOMODYNE INTERCONNECTIONS OF INTEGRATED CIRCUITS

This invention relates to interconnection of electrical elements by optical means, and in particular to interconnection of elements on semiconductor wafers and interconnections between separate wafers. Within the context of this specification 'wafers' includes both comparatively small dimensioned chips and also larger slices.

It has been recognised that the performance and size of integrated circuits is limited, in some instances, by the characteristics of the electrical interconnections; for example the capacitance and inductance of the contacts and leads may introduce time delays in the signal as it is transmitted from one part of a circuit to another.

Optical interconnection has been proposed as a way of reducing delays and adverse electrical interactions, with direct detection of the incoming optical signal by photo detectors. (J. W. Goodman et al "Optical Interconnection for VLSI Systems" Proc. IEEE, Vol. 72, No. 7, July 1984).

A disadvantage of proposed systems is that direct detection necessitates low noise, multi-stage amplification and therefore at the detection end of the optical link fabrication complexity is greatly increased, although it is possible to fabricate all the elements from silicon. At the transmission end, in order to modulate an optical signal in accordance with an output signal from a silicon integrated circuit with sufficient strength to enable direct detection it has been considered necessary to incorporate separate modulators or to fabricate modulators or light sources from Group III-V materials, again adding greatly to fabrication complexity.

The present invention provides an optical interconnection for integrated circuits employing homodyne detection, comprising a coherent light source the output of which provides both the carrier signal for modulation with the information to be transmitted, and the local oscillator signal required for homodyne detection.

According to another aspect the present invention provides an optical interconnection system for integrated circuits comprising an optical source supplying a carrier wave comprising at least two parts and a modulator at which a first part of the wave is modulated in accordance with an output signal from a first circuit, a second part of the wave passing unmodulated to a second circuit where it is mixed with the modulated carrier in homodyne detection to provide an input signal to the second circuit.

In one embodiment of the invention the modulation and detection take place respectively on the same wafer as the first and second circuits and are fabricated integrally of the same material. The wafer or wafers are preferably made of silicon and the optical transmission frequency is on or close to the band edge absorption frequency.

Within the context of this specification the expression 'optical' source includes electro-optical sources. Optical is to be construed as including the visible spectrum and also the infra-red and ultra-violet parts of the electromagnetic spectrum.

The invention is now described by way of example with reference to the accompanying drawings in which.

Figure 1:
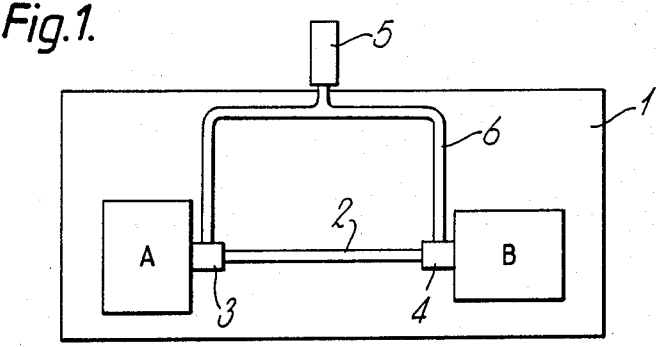
FIG. 1 is a schematic diagram of a first embodiment of the invention showing a single interconnection.

Homodyne detection of modulated optical signals is generally acknowledged to be the most sensitive technique of detection and yields high gain even from weak modulation. However, because homodyne detection requires the detector to be provided with a signal (termed the local oscillator signal) of the same frequency and phase as the incoming carrier, it is also generally the most difficult detection technique to implement, especially when the carrier frequency may be subject to drift. In the present invention the carrier beam is split prior to modulation and the unmodulated beam is utilised as the Referring now to FIG. 1, a silicon chip 1 has a first circuit area A that requires connection to a second circuit area B. The connection between areas A and B is made by a waveguide or optical fibre 2 that connects a modulator 3 associated with area A to a detector 4 associated with area B. An external narrow optical line width laser 5 provides an unmodulated input optical signal to the modulator 3 where the optical signal is modulated by the electrical signal output from circuit area A. The modulated signal is transmitted along waveguide 2 to detector 4 where it is mixed with light of the same phase and frequency for homodyne detection.

The local oscillator input to the detector 4 is provided by supplying light directly from laser 5, along local oscillator path 6 by splitting the output from laser 5 upstream of the modulator. Thus by using the same coherent source the light from the local oscillator path 6 is automatically in the required phase and of the same frequency. Any tendency for frequency drift in the laser, and hence in the carrier frequency, is immediately compensated by a similar change in the unmodulated carrier wave input as the local oscillator wave.

The sensitivity of homodyne detection enables both silicon based modulators and detectors to be used in order to simplify the fabrication process for an all silicon integrated circuit. However, for some applications it is envisaged that other materials will be deposited on to the silicon to form the modulator. Optical detectors operating at wavelengths up to the region of about 1100 nm can readily be fabricated in silicon and a silicon optical modulator operating close to or on that wavelength (that is, close to or on the absorption band edge) would be usable because the signal, although weak, would be readily detectable by the homodyne method. Also the amplification requirements after homodyne detection are less stringent than required in direct detection and a single narrow band amplifier can be used, again simplifying fabrication.

It is possible for the optical link to comprise optical fibres either free or attached to the wafer, or for a waveguide to be fabricated within the wafer itself, for example an etched channel filled with suitably doped silicon dioxide or other optically transmissive medium (as described, for example by M. Kimura et al, Hap. Jl. Appl. Phys. Vol. 19 No. 7, July 1980, ppL372-L374). Alternatively the optical communication may be through free space (or atmosphere), but in this instance alignment and scattering can create problems. In general it is preferred for the links from laser to wafer and between wafers to be via optical fibres and the links within a wafer to be via on-wafer routes.

Figure 2:
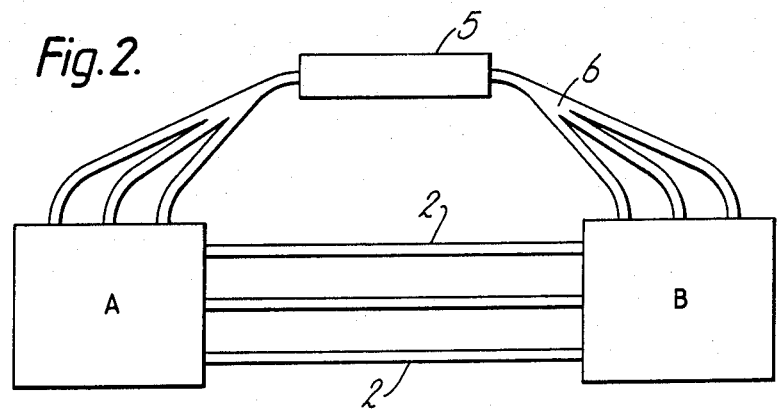
FIG. 2 is a schematic diagram of a second embodiment of the invention showing multiple interconnections.
Figure 3:
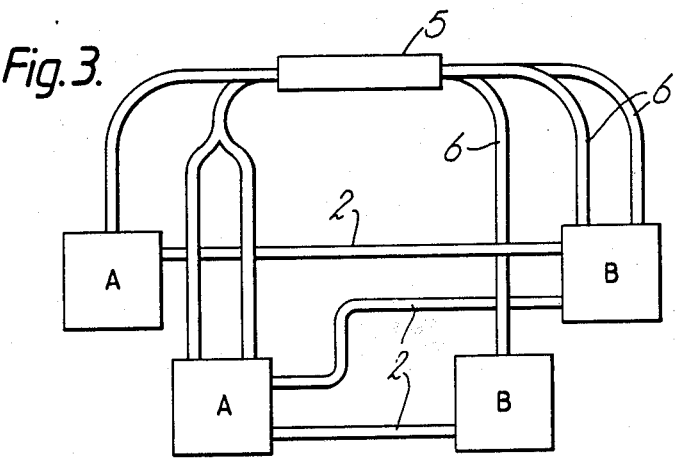
FIG. 3 is a schematic diagram of a third embodiment of the invention showing further multiple interconnections.

FIG. 2 illustrates a second embodiment of the invention in which a plurality of interconnections between circuits A and B utilise the same source laser. Each circuit A has a modulator associated with each input carrier wave and each circuit B has a detector associated with each unmodulated local oscillator input. The circuits A and B may be on a single wafer or they may be on separate wafers. In FIG. 2 the output beam from each end of laser 5 is used, the two output beams being identical. Each of the beams could be used for either A or B circuits or for combinations. FIG. 3 illustrates a further progression with more circuits from which it will be realised that a single source laser may power a complete system of circuits. Again the interconnection may be made in free space or, preferably, in waveguides such as optical fibres. For larger systems gas lasers may be employed as each modulator detector pair will preferably operate on a wave of 10 to 100 microwatts power.

The optical interconnections may be utilised as part of an integrated optical or optoelectronic device in addition to providing the function of conducting the signal between parts of an electronic system. It is envisaged that a given detector may receive signals from a plurality of modulators. The electrical signals from several circuits may be combined and transmitted along a single optical link, the sensitivity of homodyne detection enabling easier separation than direct detection.

The delay caused by optical transmission of signals depends upon the speed of light in the optical medium concerned. In silica light propagates at about $2 \times 10^8$ m/sec and therefore a 1 cm track introduces a delay of only 50 psec. Preferably the optical interconnections are less than 1 meter in length.

Within the context of this specification 'integrated circuit' includes circuits comprising electronic, optical or optoelectronic elements.

I claim:

1. An optical interconnection system comprising:
   a first coupling means for dividing a carrier wave from a laser into a first and a second portion;
   a first integrated circuit including a modulator responsive to an input signal to modulate the first portion of the carrier wave to produce an optical signal; and
   a second integrated circuit including an optical detector coupled to the first coupling means to receive the second portion of the carrier wave, and to the modulator to receive the optical signal such as to mix the second portion with the optical signal; wherein the carrier wave is divided by said coupling means into a plurality of first and second portions, each first portion passing to a modulator associated with a respective first circuit and then further passing to a homodyne detector associated with a second circuit where it is mixed with an unmodulated respectively corresponding second portion of the carrier wave.

2. An optical interconnection system according to claim 1 comprising optical fibres for conducting the carrier wave along at least part of its path.

3. An optical interconnection system according to claim 1, comprising waveguides fabricated integrally with at least one of said first and second integrated circuits.

4. An optical interconnection system according to claim 1 in which the modulator and detector are associated with a common semiconductor wafer.

5. An optical interconnection system according to claim 1 in which the modulator and detector are associated with separate semiconductor wafers.

6. An optical interconnection system according to claim 1 in which the detector is fabricated integrally with the second integrated circuit.

7. An optical interconnection system according to claim 1 in which the modulator is fabricated integrally with the first integrated circuit.

8. An optical interconnection system according to claim 1 in which at least one of the modulator and detector is fabricated from silicon integrally with a silicon integrated circuit.

9. An integrated circuit comprising an optical interconnection according to claim 1.

10. An optical interconnection system according to claim 1 in which a single laser source supplies a plurality of integrated circuits.

11. An integrated circuit comprising an optical interconnection according to claim 1.

12. An integrated circuit comprising an optical interconnection according to claim 11 and an integral laser source.

13. An optical interconnection system comprising:
    a coherent source of optical carrier signal;
    a first integrated circuit having an electro-optical modulator at an optical signal output port;
    a first optical signal path connecting a first portion of said optical carrier signal with said modulator to produce a modulated optical signal at said output port;
    a second integrated circuit having a opto-electrical homodyne demodulator at an optical signal input port;
    a second optical signal path connecting said modulated optical signal to said homodyne demodulator at said input port; and
    a third optical signal path, located separately from said other optical signal paths, said third optical signal path connecting a second portion of said optical carrier signal to said homodyne demodulator for use in homodyne demodulation of said modulated optical signal.

14. An optical interconnection system as in claim 13 wherein said first and second integrated circuits are located on separate corresponding wafers.

15. An optical interconnection system as in claim 13 wherein said first and second integrated circuits are integrally formed on a single wafer.

16. An optical interconnection system as in claim 15 wherein said optical signal paths include optical waveguides fabricated integrally with said wafer.

17. An optical interconnection system as in claim 13 further comprising:
    a plurality of said first circuits, each having a respectively connected first optical signal path between its modulator and said source;
    a plurality of said second circuits, each having a respectively connected second optical signal path between its homodyne demodulator and the modulator of a respectively associated first circuit; and
    each second circuit also having a respectively connected third optical signal path between its demodulator and said source.

18. An optical interconnection system as in claim 17 wherein said pluralities of first and second circuits and said pluralities of respectively associated first, second and third optical signal paths are all integrally formed on a common integrated circuit wafer.

* * * * *